(12) United States Patent
Guinart et al.

(10) Patent No.: US 10,065,459 B2
(45) Date of Patent: Sep. 4, 2018

(54) METHOD OF DRIVING A PROCESSOR OF AN ELECTRONIC BOX MOUNTED ON A WHEEL OF A VEHICLE

(71) Applicants: CONTINENTAL AUTOMOTIVE FRANCE, Toulouse (FR); CONTINENTAL AUTOMOTIVE GMBH, Hannover (DE)

(72) Inventors: Nicolas Guinart, Toulouse (FR); Jean-Charles Huard, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/553,272

(22) PCT Filed: Feb. 22, 2016

(86) PCT No.: PCT/EP2016/000305
§ 371 (c)(1),
(2) Date: Aug. 24, 2017

(87) PCT Pub. No.: WO2016/134840
PCT Pub. Date: Sep. 1, 2016

(65) Prior Publication Data
US 2018/0050570 A1 Feb. 22, 2018

(30) Foreign Application Priority Data

Feb. 27, 2015 (FR) ..................... 15 51704

(51) Int. Cl.
*B60C 23/04* (2006.01)
*G01M 17/02* (2006.01)
*H04L 29/08* (2006.01)

(52) U.S. Cl.
CPC ...... *B60C 23/0462* (2013.01); *B60C 23/0474* (2013.01); *B60C 23/0486* (2013.01); *G01M 17/02* (2013.01); *H04L 67/125* (2013.01)

(58) Field of Classification Search
CPC ........... B60C 23/0462; B60C 23/0474; B60C 23/0486; G01M 17/02
See application file for complete search history.

(56) References Cited

U.S. PATENT DOCUMENTS

| 2006/0220805 A1* | 10/2006 | Thomas | B60C 23/0416 340/426.33 |
| 2006/0220815 A1* | 10/2006 | Thomas | B60C 23/0416 340/447 |
| 2011/0246101 A1 | 10/2011 | Araki et al. | |

FOREIGN PATENT DOCUMENTS

FR 2 935 397 A1 3/2010
WO 2011/118823 A1 10/2010

(Continued)

OTHER PUBLICATIONS

International Search Report, dated Jun. 3, 2016, from corresponding PCT/EP2016/000305 application.

*Primary Examiner* — Leon Flores
(74) *Attorney, Agent, or Firm* — Young & Thompson

(57) ABSTRACT

Disclosed is a method for driving a processor of an electronic box mounted on a vehicle wheel, transmitting operating parameters of the wheel for implementation of a specific application by a central unit. This includes defining, for each specific application, the physical quantities liable to affect the relevance of the operating parameters, and ranges of measured values corresponding to conditions for obtaining relevant values of the operating parameters. Also included is a procedure for acquiring and transmitting the operating parameters consisting of a succession of transmission windows, during each of which the physical quantities (Continued)

Figure 1:
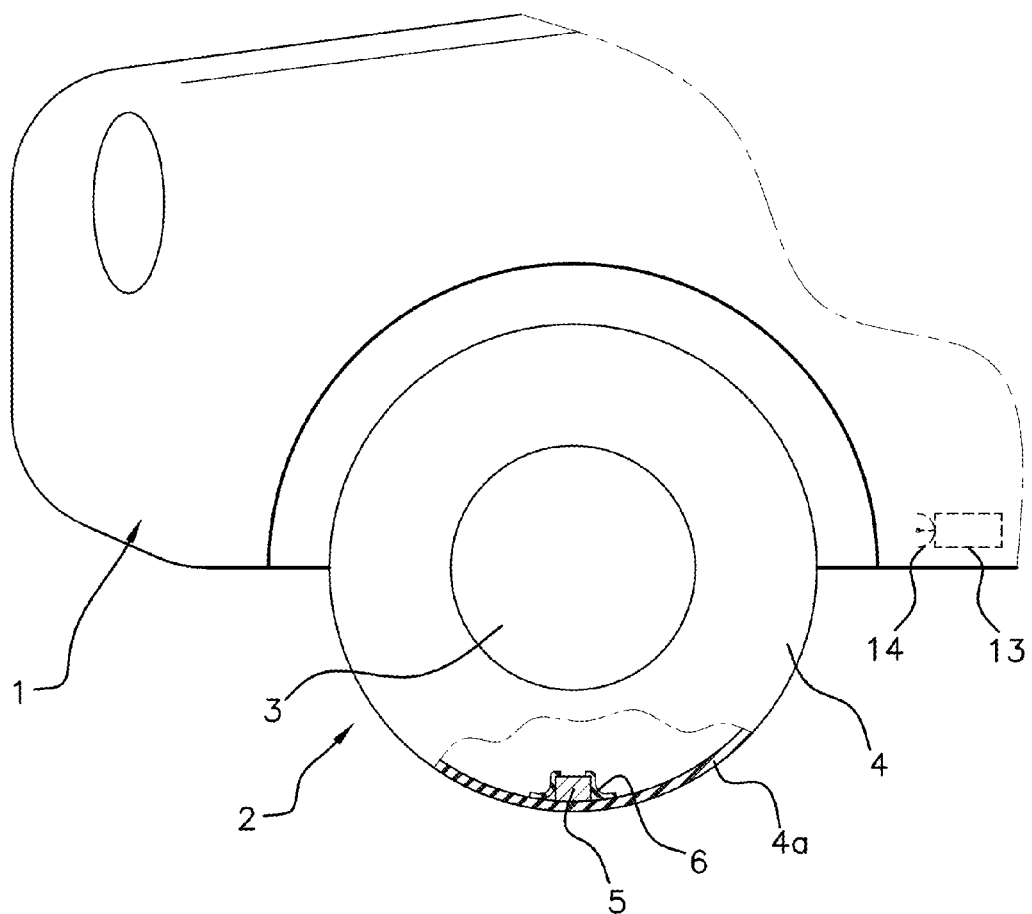

selected for the application are measured, it is checked whether the conditions for obtaining relevant values of the operating parameters are met. If so, at least one value of each parameter is acquired and transmitted, while assigning to this value a datum attesting to the relevance of the latter, and then the transmission window is closed.

20 Claims, 2 Drawing Sheets

(56) References Cited

FOREIGN PATENT DOCUMENTS

| | | |
|---|---|---|
| WO | 2011/116925 A1 | 9/2011 |
| WO | 212/091719 A1 | 7/2012 |

* cited by examiner

METHOD OF DRIVING A PROCESSOR OF AN ELECTRONIC BOX MOUNTED ON A WHEEL OF A VEHICLE

The invention relates to a method for driving a processor of an electronic box mounted on a wheel, equipped with a tire, of a vehicle, for the purpose of acquiring and transmitting, to a central unit, operating parameters of said wheel that are intended for the implementation of a specific application by said central unit.

For safety purposes, an increasing number of vehicles possess detection systems including electronic boxes mounted on each of the wheels of the vehicle, enclosing sensors dedicated to measuring mechanical quantities, temperature, pressure, of said tire, and kinematic quantities representative of the dynamics of the vehicle.

In addition to measuring the parameters and transmitting standard parameters that are intended to provide direct information about operating parameters of the wheels to the driver, contemporary electronic boxes are designed to calculate, on the basis of the measured parameters, additional information including, for example:
- data characteristic of the footprint of the tire, which data may be used by the central unit for the purpose of determining the position of the wheels equipped with the electronic boxes, or for the purpose of estimating the load applied to each of the wheels of the vehicle,
- data representative of the deformation of the tire when the latter is in contact with the ground, which data enable the central unit, in particular, to calculate the tread wear of said tire.

The measurement and the transmission of the data by the electronic boxes are currently carried out periodically, and the quality of the transmitted information is determined by the central unit, which is programmed, to this end, to consolidate or reject said information using a dedicated processing operation.

However, this solution leads to a high rate of rejections, by the central unit, of the data transmitted by the electronic boxes, which is reflected in a resultant increase in the amount of said data required to implement each application, and consequently leads in particular to:
- excessive power consumption affecting the processors integrated into the electronic boxes, which is reflected in a reduction in the lifetime of the batteries supplying power to said electronic boxes,
- slower processing of the applications using the data.

The present invention aims to mitigate these drawbacks, and its main objective is that of providing a method for driving a processor of an electronic box leading to the transmission, for a given specific application, of preselected operating parameter values so as to minimize the rate of rejection of said data when this specific application is implemented.

To this end, the invention targets a method for driving a processor of an electronic box mounted on a wheel, equipped with a tire, of a vehicle, and incorporating means for measuring physical quantities, such as mechanical quantities, temperature, pressure, of said tire, and kinematic quantities representative of the dynamics of the vehicle, for the purpose of acquiring and transmitting, to a central unit, operating parameters of said wheel that are intended for the implementation of a specific application by said central unit, and, according to the invention, this driving method consists:
- in defining, for each specific application, each physical quantity liable to affect the relevance of the operating parameters, and for said physical quantities, ranges of measured values corresponding to conditions for obtaining relevant values of said operating parameters,
- in defining a temporal window, termed transmission window, tailored to permit, during a maximum time frame Ta, the obtaining of relevant values of the operating parameters
- and in implementing a procedure for acquiring and transmitting the operating parameters consisting, until transmission of a predetermined number of operating parameters that is dependent on the application, of a succession of transmission windows:
  - during each of which the physical quantities selected for the application are measured, and it is checked whether the conditions for obtaining relevant values of the operating parameters are met, and:
    - a. if so, at least one value of each operating parameter is acquired and transmitted, while assigning to this value a datum attesting to the relevance of the latter, and then the transmission window is closed,
    - b. if not, and until expiry of the time frame Ta, the step of measuring and checking the selected physical quantities is repeated,
  - and at the end of each of which, in the absence of obtaining satisfactory conditions after expiry of the time frame Ta, at least one value of each operating parameter is acquired and transmitted, while assigning to this value a datum attesting to the lack of relevance of the latter, and then the transmission window is closed.

The method according to the invention therefore consists in filtering the operating parameter values transmitted by each electronic box, obtained:
- by implementing monitoring of the conditions in which these values are acquired,
- by creating temporal windows consisting of time slots allocated for the acquisition of at least one exploitable value of the operating parameter, at the end of each of which at least one value is transmitted with a datum representative of the relevance of the latter, which provides information to the central unit enabling this value to be exploited appropriately.

Such a method therefore leads to the transmission, for a given specific application, of:
- a large majority of operating parameter values that are able to be exploited directly for the purpose of implementing this specific application,
- a minority of operating parameter values that are obtained in conditions other than the conditions for obtaining relevant values of said operating parameters, said values possibly being able to be exploited by the central unit through a specific processing operation.

In practice, this driving method leads to a notable reduction in the percentage of rejection, by a central unit, of the data transmitted by electronic boxes when a specific application is implemented.

According to one advantageous mode of implementation of the invention, the openings of two successive transmission windows are controlled so as to be spaced apart by a predetermined time period Ts of duration greater than the time frame Ta.

Furthermore, this time period Ts is advantageously tailored, according to the invention, such that the transmission frequency of the operating parameters is in accordance with the standards for electromagnetic wave emission.

Moreover, according to another advantageous mode of implementation of the invention, when an operating parameter value assigned a datum attesting to its lack of relevance is transmitted, data representative of the conditions for obtaining this operating parameter value are furthermore transmitted, so as to enable the central unit to more easily define the possible conditions for exploiting this value.

According to another advantageous mode of implementation of the invention, the physical quantities liable to affect the relevance of the operating parameters comprise quantities representative of the longitudinal dynamics and of the lateral dynamics of the wheel.

In addition, these physical quantities also comprise, advantageously according to the invention, a quantity representative of the signal-to-noise ratio of the signals delivered by the measuring means.

Moreover, a plurality of options may be implemented for the purpose of transmitting the operating parameters.

Thus, according to a first option, a single value of each operating parameter is transmitted during each transmission window.

By contrast, another option consists in acquiring a sequence of values of each operating parameter, the transmission then being able to consist, advantageously according to the invention:

either in transmitting this sequence of values of each operating parameter
or in transmitting a datum representative of the population of said values.

Figure 2:
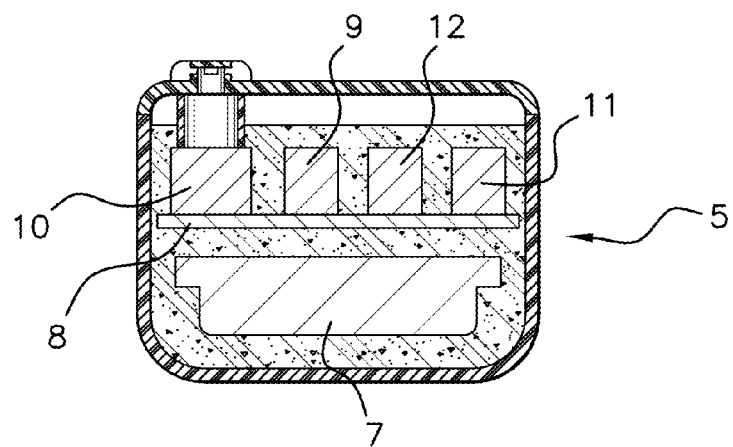
Figure 3:
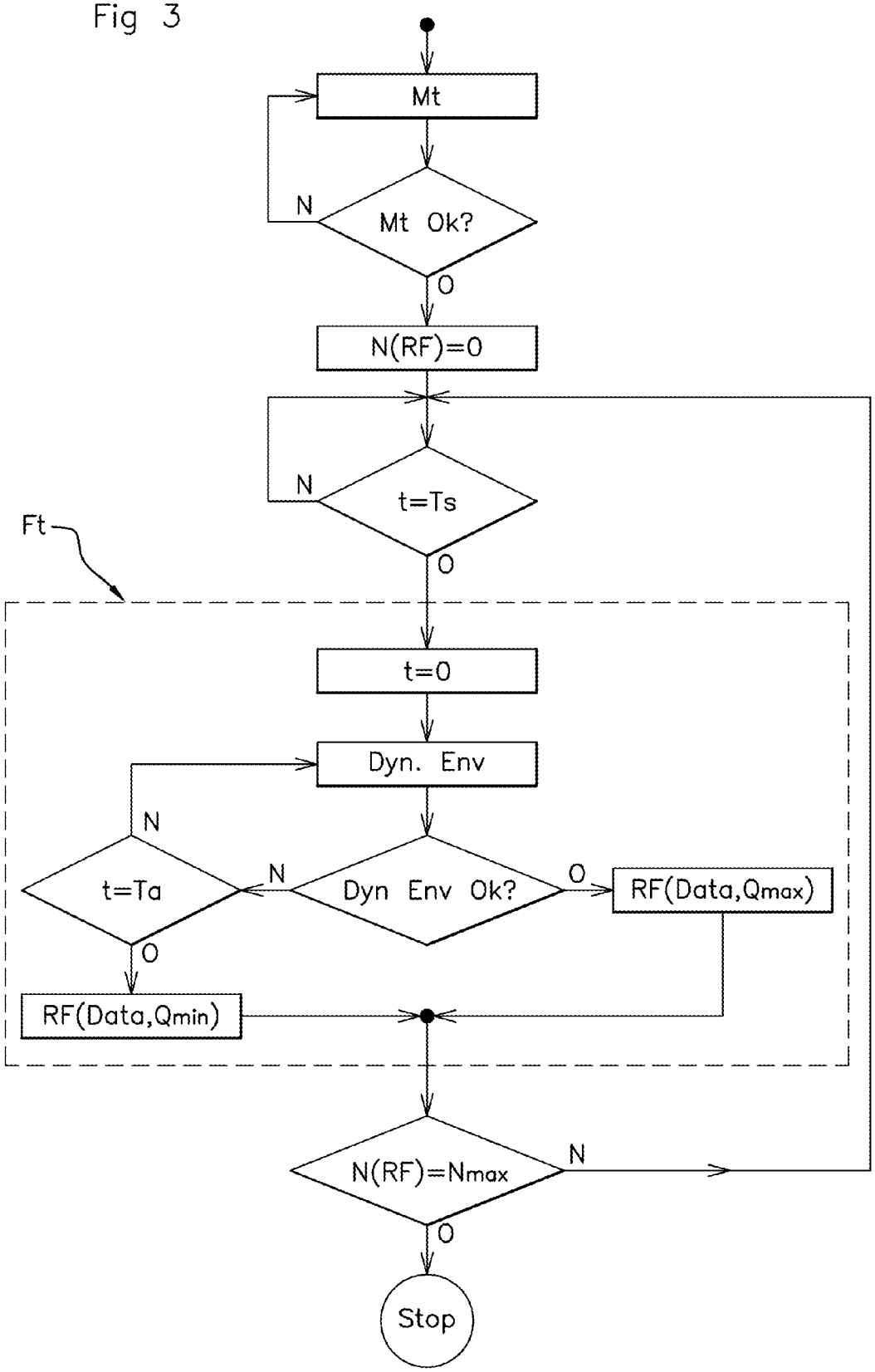

Other features, aims and advantages of the invention will emerge from the following detailed description with reference to the appended drawings showing, by way of non-limiting example, one preferred mode of implementation thereof. In these drawings:

FIG. 1 is a schematic view of the front portion of a motor vehicle equipped with an electronic box enabling the implementation of the method according to the invention for driving the processor of this electronic box, FIG. 2 is a cross-sectional view, on an enlarged scale, of an electronic box enabling the implementation of the method according to the invention, and FIG. 3 is a schematic illustrative overview of the method according to the invention.

The method according to the invention targets a function for driving a processor of an electronic box mounted on a wheel, equipped with a tire, of a motor vehicle, for the purpose of acquiring and transmitting, to a central unit, operating parameters of said wheel that are intended for the implementation of a specific application by said central unit.

For the purpose of implementing this method, according to the example shown in FIG. 1, the vehicle 1 includes wheels such as 2 formed, as is conventional, from a wheel rim 3 fitted with a tire 4, and a system for monitoring parameters such as pressure, temperature of each of said tires, and radial acceleration and lateral acceleration of said wheel, including, firstly, an electronic box 5 associated with each wheel 2.

According to the example shown in FIGS. 1 and 2, this electronic box 5 is positioned on the inner face of the tread 4a of a tire 4. In addition, it is inserted, for the purpose of holding it, into a flexible receptacle 6 joined (bonded) to the tread 4a and made of a plastic material designed to form a 'pocket' of retentive shape in which the electronic box 5 is trapped.

In addition, as shown in FIG. 2, each electronic box 5 in particular incorporates, embedded in a filler material, a battery 7 housed in the base of said box, and above this battery 7, an electronic board 8, on which are connected:

a processor 9 linked to an RF radiofrequency emitter connected to an antenna (not shown),
a pressure sensor 10 provided with a measuring chamber,
a sensor 11 for measuring the radial acceleration of the wheel 2, of the electronic microsystem, piezoelectric sensor, shock sensor, etc. type,
and a sensor 12 for measuring the lateral acceleration of the wheel 2, of the electronic microsystem type.

The monitoring system also comprises a centralized calculator or central unit 13 embedded in the vehicle 1, including a processor and incorporating an RF radiofrequency receiver linked to an antenna 14 for receiving the signals emitted by the electronic boxes 5.

An exemplary implementation of the method according to the invention for driving the processor 9 integrated into the electronic box 5 mounted on the wheel 2 of the motor vehicle 1 is described below with reference to FIG. 3.

Firstly, this method requires determining, in a preliminary phase, for each specific application implemented by the central unit 13:

the physical quantities, measured by the measuring sensors 11, 12, representative of the longitudinal dynamics and of the lateral dynamics of the wheel 2 that are liable to affect the relevance of the values of the operating parameters used during this implementation,
for each of said physical quantities, ranges of measured values corresponding to conditions for obtaining relevant values of said operating parameters.

By way of example, in the context of an application aimed at determining the load applied to each wheel 2 of the vehicle 1 on the basis of data representative of the length of the footprint of the tire 4 fitted on this wheel 2, the optimum values of the length of the footprint are obtained when the vehicle 1 is moving in a straight line at a steady speed.

The selected ranges of the values provided by the measuring sensors 11 and 12 therefore consist of ranges of values lower than determined thresholds representative of a steady speed and direction.

It should be noted that, in the context of an application aimed at locating each wheel 2 of the vehicle 1 on the basis of data representative of the length of the footprint of the tire 4 fitted on this wheel 2, the optimum values of the length of the footprint are, by contrast, obtained for 'impacted' running conditions (bends, accelerations/decelerations) that lead to resultant variations in the values provided by the measuring sensors 11, 12.

As well as the quantities representative of the longitudinal dynamics and of the lateral dynamics of each wheel 2, the method according to the invention also consists in using, as a physical quantity liable to affect the relevance of the operating parameter values, a quantity representative of the signal-to-noise ratio of the signals delivered by the measuring means, making it possible to discard the signals having a noise greater than a predetermined threshold.

The method according to the invention also consists in defining a transmission temporal window Ft tailored to permit, during a maximum time frame Ta, the obtaining of relevant values of the operating parameters, and to this end, after the opening of each of which, as shown in FIG. 3:

the physical quantities selected for the application are measured, and it is checked whether the conditions for obtaining relevant values of the operating parameters are met, and:
a. if so, at least one value of each operating parameter is acquired and transmitted, while assigning to this value a datum Qmax attesting to the relevance of the latter, and then the transmission window Ft is closed, b. if not, and until expiry of the time frame Ta, the step of measuring and checking the selected physical quantities is repeated, in the absence of obtaining satisfactory conditions after expiry of the time frame Ta, at least one value of each operating parameter is acquired and transmitted, while assigning to this value, on the one hand, a datum Qmin attesting to the lack of relevance of the latter, and, on the other hand, data representative of the conditions for obtaining this operating parameter value, and then the transmission window Ft is closed.

In addition, before closure of each transmission window Ft, the transmission of the operating parameters consists in acquiring a sequence of values of each operating parameter, then:

either in transmitting this sequence of values of each operating parameter, or in transmitting a datum representative of the population of said values.

Moreover, when the method according to the invention is implemented, as shown in FIG. 3, the openings of two successive transmission windows Ft are furthermore controlled so as to be spaced apart by a predetermined time period Ts of duration greater than the time frame Ta, and tailored such that the transmission frequency of the operating parameters is in accordance with the standards for electromagnetic wave emission.

By way of example, the time Ta may be chosen to be equal to 10 seconds and the time Ts equal to 16 seconds.

These successive openings of the transmission windows Ft are, lastly, implemented until the emission of a number Nmax of signals N(RF) which is dependent on the application.

Such a driving method leads to the transmission, for a specific application, of preselected values of the operating parameters that make it possible to minimize the rate of rejection of said values when this specific application is implemented.

In addition, the values that are not preselected and therefore assigned a datum Qmin attesting to their lack of relevance, being transmitted alongside data representative of the conditions in which they were obtained, these values may also be processed by the central unit 13, either by taking into account the conditions in which they were obtained, or for implementing another specific application.

The invention claimed is:

1. A method for driving a processor (9) of an electronic box (5) mounted on a wheel (2), equipped with a tire (4), of a vehicle (1), and incorporating means (10-12) for measuring physical quantities, such as mechanical quantities, temperature, pressure, of said tire, and kinematic quantities representative of the dynamics of the vehicle (1), for the purpose of acquiring and transmitting, to a central unit (13), operating parameters of said wheel that are intended for the implementation of a specific application by said central unit, said driving method comprising:

defining, for each specific application, each physical quantity liable to affect the relevance of the operating parameters, and for said physical quantities, ranges of measured values corresponding to conditions for obtaining relevant values of said operating parameters, defining a temporal window Ft, termed transmission window, tailored to permit, during a maximum time frame Ta, the obtaining of relevant values of the operating parameters, and implementing a procedure for acquiring and transmitting the operating parameters consisting, until transmission of a predetermined number of operating parameters that is dependent on the application, of a succession of transmission windows Ft:

during each of which the physical quantities selected for the application are measured, and it is checked whether the conditions for obtaining relevant values of the operating parameters are met, and:

a. if so, at least one value of each operating parameter is acquired and transmitted, while assigning to this value a datum Qmax attesting to the relevance of the latter, and then the transmission window Ft is closed, b. if not, and until expiry of the time frame Ta, the step of measuring and checking the selected physical quantities is repeated, and at the end of each of which, in the absence of obtaining satisfactory conditions after expiry of the time frame Ta, at least one value of each operating parameter is acquired and transmitted, while assigning to this value a datum Qmin attesting to the lack of relevance of the latter, and then the transmission window Ft is closed.

2. The driving method as claimed in claim 1, wherein the openings of two successive transmission windows Ft are controlled so as to be spaced apart by a predetermined time period Ts of duration greater than the time frame Ta.

3. The driving method as claimed in claim 2, wherein, when an operating parameter value assigned a datum Qmin attesting to its lack of relevance is transmitted, data representative of the conditions for obtaining this operating parameter value are furthermore transmitted.

4. The driving method as claimed in claim 2, wherein the physical quantities liable to affect the relevance of the operating parameters comprise quantities representative of the longitudinal dynamics and of the lateral dynamics of the wheel (2).

5. The driving method as claimed in claim 2, wherein the physical quantities liable to affect the relevance of the operating parameters comprise a quantity representative of the signal-to-noise ratio of the signals delivered by the measuring means.

6. The driving method as claimed in claim 2, wherein, during each transmission window Ft, a sequence of values of each operating parameter is acquired and transmitted.

7. The driving method as claimed in claim 2, wherein, during each transmission window Ft, a sequence of values of each operating parameter is acquired, and a datum representative of the population of said values is calculated and transmitted.

8. The driving method as claimed in claim 1, wherein, when an operating parameter value assigned a datum Qmin attesting to its lack of relevance is transmitted, data representative of the conditions for obtaining this operating parameter value are furthermore transmitted.

9. The driving method as claimed in claim 8, wherein the physical quantities liable to affect the relevance of the operating parameters comprise quantities representative of the longitudinal dynamics and of the lateral dynamics of the wheel (2).

10. The driving method as claimed in claim 8, wherein the physical quantities liable to affect the relevance of the operating parameters comprise a quantity representative of the signal-to-noise ratio of the signals delivered by the measuring means.

11. The driving method as claimed in claim 8, wherein, during each transmission window Ft, a sequence of values of each operating parameter is acquired and transmitted.

12. The driving method as claimed in claim 8, wherein, during each transmission window Ft, a sequence of values of each operating parameter is acquired, and a datum representative of the population of said values is calculated and transmitted.

13. The driving method as claimed in claim 1, wherein the physical quantities liable to affect the relevance of the operating parameters comprise quantities representative of the longitudinal dynamics and of the lateral dynamics of the wheel (2).

14. The driving method as claimed in claim 13, wherein the physical quantities liable to affect the relevance of the operating parameters comprise a quantity representative of the signal-to-noise ratio of the signals delivered by the measuring means.

15. The driving method as claimed in claim 13, wherein, during each transmission window Ft, a sequence of values of each operating parameter is acquired and transmitted.

16. The driving method as claimed in claim 13, wherein, during each transmission window Ft, a sequence of values of each operating parameter is acquired, and a datum representative of the population of said values is calculated and transmitted.

17. The driving method as claimed in claim 1, wherein the physical quantities liable to affect the relevance of the operating parameters comprise a quantity representative of the signal-to-noise ratio of the signals delivered by the measuring means.

18. The driving method as claimed in claim 17, wherein, during each transmission window Ft, a sequence of values of each operating parameter is acquired and transmitted.

19. The driving method as claimed in claim 1, wherein, during each transmission window Ft, a sequence of values of each operating parameter is acquired and transmitted.

20. The driving method as claimed in claim 1, wherein, during each transmission window Ft, a sequence of values of each operating parameter is acquired, and a datum representative of the population of said values is calculated and transmitted.

* * * * *